(12) United States Patent
Cheng et al.

(10) Patent No.: US 11,060,758 B2
(45) Date of Patent: Jul. 13, 2021

(54) AIR CONDITIONER FILTER AND METHOD OF MANUFACTURE

(71) Applicant: 3M INNOVATIVE PROPERTIES COMPANY, St. Paul, MN (US)

(72) Inventors: Liang Cheng, Shanghai (CN); Andrew R. Fox, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 323 days.

(21) Appl. No.: 16/079,729

(22) PCT Filed: Feb. 26, 2016

(86) PCT No.: PCT/CN2016/074712
§ 371 (c)(1),
(2) Date: Aug. 24, 2018

(87) PCT Pub. No.: WO2017/143592
PCT Pub. Date: Aug. 31, 2017

(65) Prior Publication Data
US 2019/0054409 A1    Feb. 21, 2019

(51) Int. Cl.
*F24F 13/28* (2006.01)
*B01D 46/00* (2006.01)
(Continued)

(52) U.S. Cl.
CPC .......... *F24F 13/28* (2013.01); *B01D 46/0001* (2013.01); *B01D 46/0005* (2013.01);
(Continued)

(58) Field of Classification Search
CPC ............ B01D 46/0001; B01D 46/0005; B01D 46/0032; B01D 46/10; B01D 2265/04;
(Continued)

(56) References Cited

U.S. PATENT DOCUMENTS 3,970,440 A * 7/1976 Copenhefer ........... B01D 46/10
                                                                  55/501
RE30,782 E    10/1981 van Turnhout
(Continued)

FOREIGN PATENT DOCUMENTS

CN    2230411    7/1996
CN    2394147    8/2000
(Continued)

OTHER PUBLICATIONS

JPA1999182922_ENG (WIPO translation of Norimitsu) (Year: 1999).*
(Continued)

*Primary Examiner* — Jonathan Miller
*Assistant Examiner* — Gabriel E Gitman
(74) *Attorney, Agent, or Firm* — 3M IPC

(57) ABSTRACT

Air filters are disclosed. The air filters include filtration media comprising a first surface (104) comprising a first region (106) proximate a first end (110) of the filtration media and a second region (108) proximate a second end (112) of the filtration media. The second region (108) is configured to provide a zone including either a densified zone of the filtration media or a support layer (114) adjacent to the filtration media. Also an air conditioning unit with the air filters is disclosed. And also a method of manufacturing the air filters is disclosed.

12 Claims, 7 Drawing Sheets

(51) Int. Cl.
   *B01D 46/10*      (2006.01)
   *F24F 8/108*      (2021.01)

(52) U.S. Cl.
   CPC ......... *B01D 46/0032* (2013.01); *B01D 46/10* (2013.01); *B01D 2265/04* (2013.01); *B01D 2275/10* (2013.01); *B01D 2279/50* (2013.01); *F24F 8/108* (2021.01)

(58) Field of Classification Search
   CPC . B01D 2279/50; B01D 2275/10; F24F 13/28; F24F 2003/1614; F24F 8/108
   See application file for complete search history.

(56) References Cited

U.S. PATENT DOCUMENTS

| | | | |
|---|---|---|---|
| 4,813,948 A | | 3/1989 | Insley |
| 4,886,562 A | | 12/1989 | Pinson |
| 4,889,542 A | | 12/1989 | Hayes |
| 5,230,800 A | | 7/1993 | Nelson |
| 5,674,302 A | * | 10/1997 | Nakayama ......... B01D 46/0001 210/493.1 |
| 6,419,729 B1 | * | 7/2002 | Duffy ................ B01D 39/163 55/385.6 |
| 6,627,563 B1 | | 9/2003 | Huberty |
| 8,162,153 B2 | | 4/2012 | Fox |
| 8,529,671 B2 | | 9/2013 | Sebastian |
| 9,129,940 B2 | | 9/2015 | Hsieh |
| 2004/0011204 A1 | | 1/2004 | Both |
| 2008/0038976 A1 | | 2/2008 | Berrigan |
| 2008/0257155 A1 | * | 10/2008 | Bacino ................ B01D 46/54 96/11 |

FOREIGN PATENT DOCUMENTS

| | | | | |
|---|---|---|---|---|
| CN | 2497215 | | 6/2002 | |
| CN | 201375862 | | 1/2010 | |
| CN | 201551913 | | 8/2010 | |
| CN | 203916329 | | 11/2014 | |
| CN | 203916329 U | * | 11/2014 | ......... B01D 46/0001 |
| JP | 62-062820 | | 4/1987 | |
| JP | U11987062820 | * | 4/1987 | |
| JP | 3052413 | | 7/1998 | |
| JP | A1999182922 | * | 6/1999 | |
| JP | 11-182922 | | 7/1999 | |
| WO | WO 85/02351 A1 | | 6/1985 | |
| WO | WO 00/44971 A1 | | 8/2000 | |
| WO | WO 01/078865 A1 | | 10/2001 | |
| WO | WO 02/030544 A1 | | 4/2002 | |
| WO | WO 2009/032302 A1 | | 3/2009 | |
| WO | WO 2015-112656 | | 7/2015 | |
| WO | WO 2016-119080 | | 8/2016 | |

OTHER PUBLICATIONS

Speedclean. (2013). Ductless Mini Split System Maintenance: The Challenges . . . and Opportunities. https://www.speedclean.com/news/ductless-mini-split-maintenance/ (Year: 2013).*
CN203916329U_ENG (Espacenet machine translation of Fox) (Year: 2014).*
JPU11987062820_ENG (Espacenet machine translation of Sharp Corporation) (Year: 1987).*
International Search report for PCT International Application No. PCT/CN2016/074712 dated Sep. 7, 2016, 6 pages.

* cited by examiner

AIR CONDITIONER FILTER AND METHOD OF MANUFACTURE

CROSS REFERENCE TO RELATED APPLICATIONS

This application is a national stage filing under 35 U.S.C. 371 of PCT/CN2016/074712, filed Feb. 26, 2016, the disclosure of which is incorporated by reference in its/their entirety herein.

BACKGROUND

Mini-split type air conditioners, which have an outdoor compressor and condenser and an indoor wall-mounted fan and evaporator unit, are a commonly used type of air conditioning unit for residential and commercial buildings. Generally, these types of air conditioners include one or two rigid filters that are integrated in the unit but can be removable from the unit. These rigid filters are generally positioned on the inlet side of the air conditioning unit and work to catch larger particulates and keep the air conditioning coils clean. However, these filters often are not capable of catching smaller particulates that are subsequently passed through the air conditioner and into the living unit. As a result, the purity of the air in the living unit suffers and inhabitants of the living unit may suffer respiratory or other health issues.

SUMMARY

The present inventors have recognized, among other things, that a problem to be solved can include providing cost-effective and easy-to-install air filtration articles into existing air conditioners. The present inventors developed a supplementary filter for use in conjunction with an existing air conditioner that can aid in filtering out small particulates from the intake air and provide more "pure" air to the living unit. In some embodiments, the air filter that has a zone that allows for an adhesive strip with liner to be securely fastened to the filter, such that a user can remove the liner, apply the filter to the air conditioning unit, and not damage the filter in the process.

In one example, the present description provides an air filter. The air filter includes filtration media comprising a first surface comprising a first region proximate a first end of the media and a second region proximate a second end of the media. The air filter also includes an adhesive on at least a portion of the second region of the filtration media. At least a portion of the second region of the filtration media further comprises at least one of:
(1) a support layer positioned adjacent to the first surface of the filtration media;
and/or (2) a densified region in which fibers in the filtration media that are proximate the first surface in the second region are more densely configured than the fibers proximate the first surface in the first region.

In yet another example, the present description provides a method of manufacturing an air filter. The method includes (1) providing filtration media; (2) treating a second region of a surface of the filtration media and leaving a first region of the surface of the filtration media undisturbed; and (3) applying an adhesive to the surface of the filtration media in the second region.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
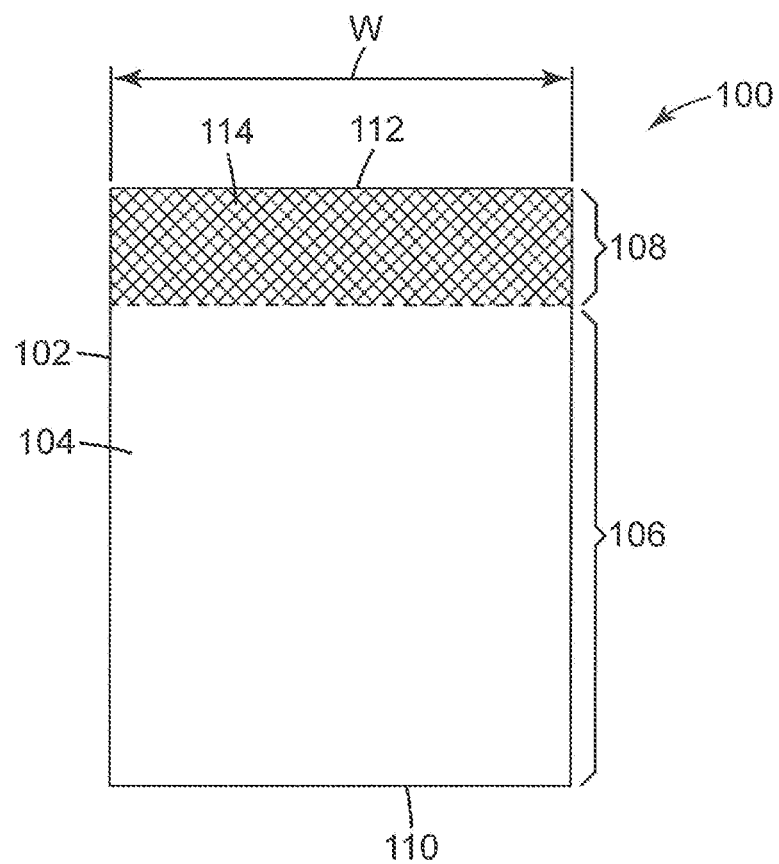
FIG. 1 provides a top view of an exemplary air filter according to the present description.

The inventors have recognized that providing a supplementary filter for use in conjunction with an existing air conditioner that can aid in filtering out small particulates from the intake air and provide purified air to the living unit. The filter can be easily applied and replaced by the end user after a given amount of collection of particulates. The presently described air filters include a zone that allows for an adhesive strip with liner to be securely fastened to the filter, such that a user can remove the liner, apply the filter to the air conditioning unit, and not damage the filter in the process. The filter can be removed after use and easily replaced by the user with a new filter when the filter has reached an end of useful life. Application of the filters described herein provide a simple, cost-effective solution for transforming a typical wall-mounted type air conditioner from a simple air conditioner into an air conditioner and air purifier. Air filters of the types described herein are especially desirable in areas of poor air quality and high pollution.

Potentially suitable filter media, for one or both of the filter and the supplementary filter, may include e.g. paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web comprised of polyethylene, polypropylene or poly(lactic acid) may be suitable, for example. Any suitable method of making a nonwoven web (e.g., melt-blowing, melt-spinning, carding, and so on) may be used. Filter media may also include one or more of sorbents, catalysts, and activated carbon (granules, fibers, fabric, and molded shapes).

In some embodiments, pleated filter media may be an electret material, comprised of, for example, any charged material, such as split fibrillated charged fibers as described in U.S. Pat. RE 30782. Such charged fibers can be formed into a nonwoven web by conventional means and optionally joined to a scrim, such as disclosed in U.S. Pat. No. 5,230,800 forming an outer support layer. In other embodiments, filter media can be a melt blown microfiber nonwoven web, for example as disclosed in U.S. Pat. No. 4,813,948, which can optionally be joined to a secondary layer during web formation as disclosed in that patent, or subsequently joined to a secondary web in any conventional manner Filtration media that may be particularly suitable for certain applications may include, for example, one or more of media of the general types described in U.S. Pat. No. 8,162,153, in U.S. Pat. No. 9,129,940, and in U.S. Patent Application Publication 2004/0011204, and media generally known as tribocharged media. Any such media can be charged to form an electret, if desired. In addition to such filter media, other filter media-types may be used in other embodiments that are selected based on the environmental conditions where the embodiment is installed as well as general availability of particular medias in such locales. (Note that each of the patents and published patent applications referenced in the present paragraph, and elsewhere herein, are incorporated herein in their entireties by reference to form a part of the present document.)

FIG. 1 provides a top view of an exemplary air filter 100 according to the present description. Air filter 100 can include a filtration media layer 102 that has a first surface 104 that can be configured to interface with an integrated air filter of an air conditioning unit (as will be illustrated in later figures). The integrated air filter may consist of a thin injection molded plastic frame which is directly formed onto a coarse mesh made of woven plastic filaments. The integrated air filter may be rigid in the sense of being durable and self-supporting, but it is also generally flexible to allow it to curve during installation and wrap approximately 90 degrees of bending, depending on the unit into which it is installed. The first surface 104 can include a first region 106 that is proximate a first end 110 of the media layer 102. The first surface 104 can further include a second region 108 that is positioned proximate a second end 112 of the media layer 102. In some cases, the second region 108 and/or the first region 106 can each extend across an entire width W of the media layer 102 on the first surface 104. In some cases, the second region 108 and/or the first region 106 extend across less than the entire width of the media layer 102. In some cases, as illustrated in FIG. 1, the first region 106 can cover a greater surface area of the first surface 104 than the second region 108. For example, generally the second region 108 can cover between about 3% and 20% of the first surface 104, with the first region 106 covering the remainder. In other cases, the first and second regions 106, 108 can be equal in area, or the second region 108 can have an area larger than the first region 106.

Figure 2:
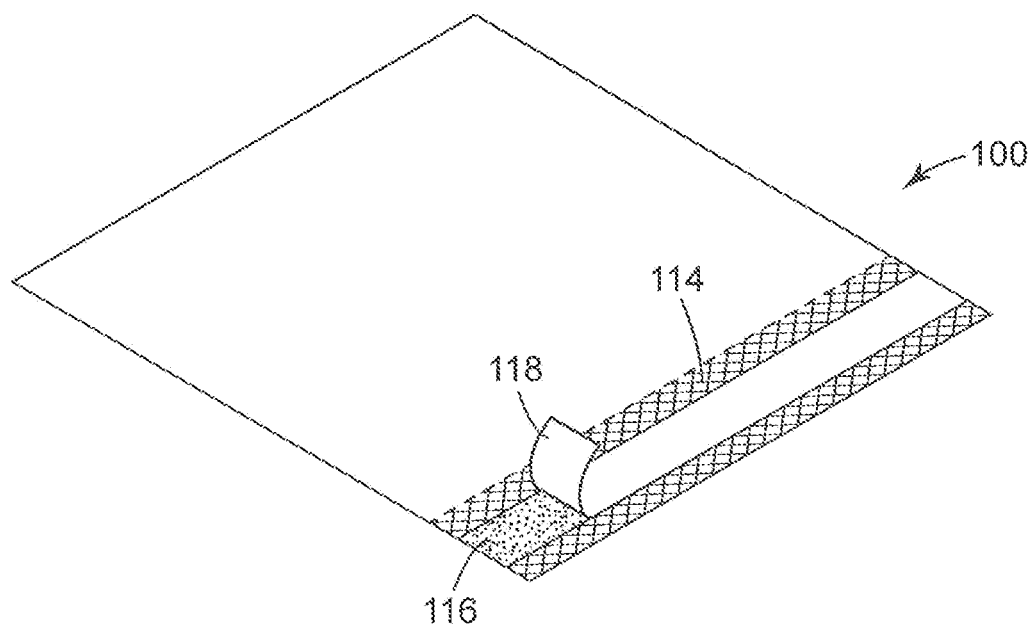
FIG. 2 provides a perspective view of an exemplary air filter according to the present description.
Figure 3A:
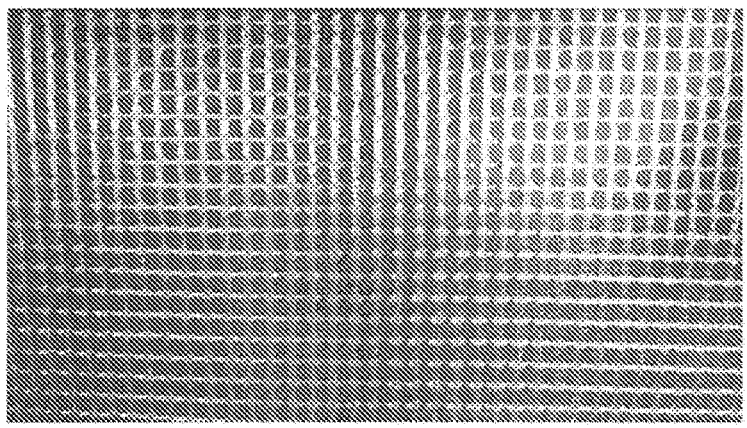
FIGS. 3A-3E provide views of various exemplary materials that can be used as a support layer.
Figure 3B:
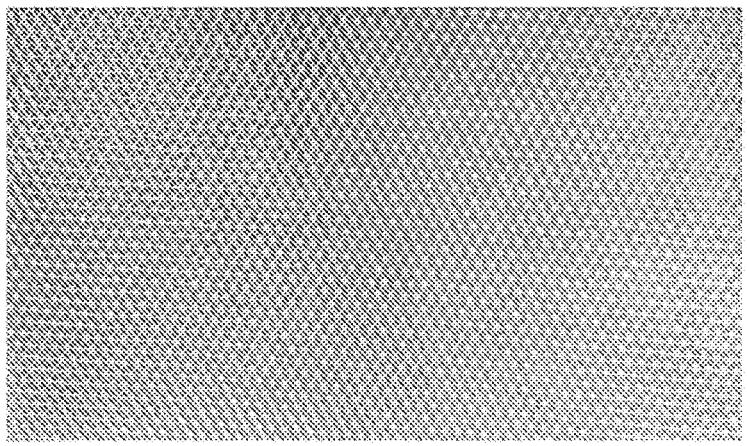
Figure 3C:
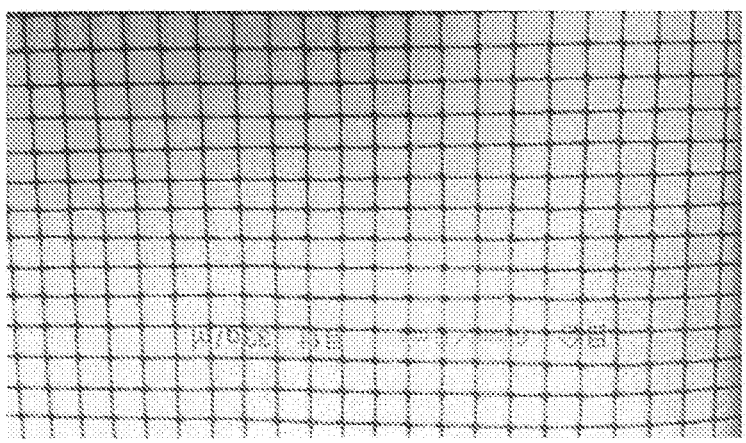
Figure 3D:
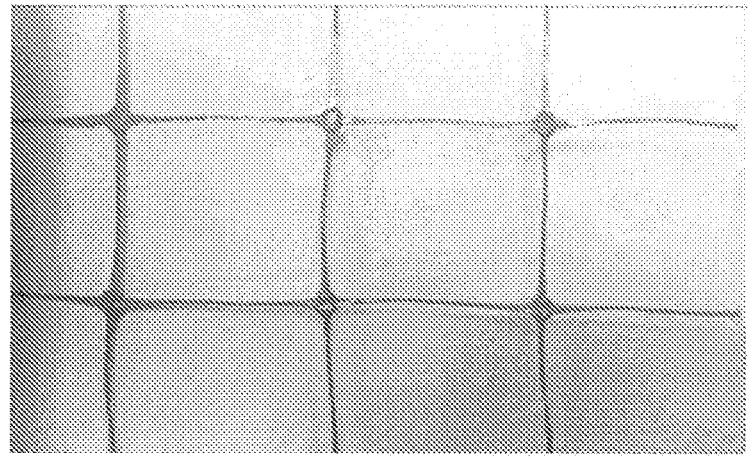
Figure 3E:
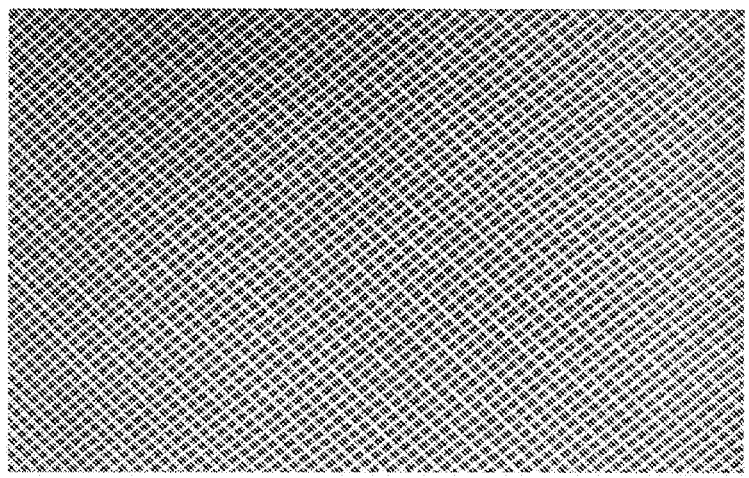

The air filter 100 can additionally include a support layer 114 that can be positioned on the first surface 104 of the media layer 102. As illustrated in FIG. 2, the support layer 114 can be configured to receive an adhesive layer 116 and liner 118 (shown covering adhesive layer 116 in FIG. 2) with sufficient bonding strength that the media layer 102 is not disturbed when the liner 118 is removed from the adhesive layer 116. The adhesive layer 116 can be bonded to the surface of the support layer 114 opposite the media layer 102 in the second region 108 and the removable liner 118 can be positioned on the opposite surface of the adhesive layer 116 from the support layer 114. In some cases, the air filter 100 of the present description can also be provided with supplemental adhesive layers 116 with strips 118 that can be applied to other areas of the surface 104 by the end user to provide greater adhesion to an air filter. Note that although the support layer 114 is illustrated along only a single outward edge of the first surface 104, other embodiments may include a plurality of support layers 114 each positioned along a respective outward edge of the first surface 104. The plurality of support layers 114, each having a respective adhesive layer 116 and liner 118, may include two support layers 114 along opposing outward edges of the first surface in some embodiments. Other embodiments may include three, four, or more support layers 114 depending on the particular embodiment and a shape formed by outward edges of the first surface 104.

The adhesive of the adhesive layer 116 is selected to be securely fastened to the integrated air filter, such that a user can remove the liner 118, apply the air filter 100 to the integrated air filter of the air conditioning unit, and not damage the integrated air filter in the process. An example of such an adhesive is the double coated tissue tape, adhesive 9448A available from 3M Company of St. Paul, Minn. In some embodiments, the adhesive of the adhesive layer 116 is a pressure sensitive adhesive. In some embodiments, the adhesive of the adhesive layer 116 is cleanly removable from an integrated rigid air filter of an air conditioning unit. Cleanly removable generally means that the adhesive does not leave reside behind and does not disturb fibers or other material of the integrated rigid air filter when it is removed.

The adhesive layer 116, in some embodiments, may have a width of between three (3) millimeters (mm) and twenty (20) mm. In one particular embodiment, the adhesive layer 116 has a width of ten (10) mm. The length of the adhesive layer may be tailored to the specific air filter 100 dimensions of a particular embodiment. However, the width and the particular adhesive chosen may vary between embodiments. Further, in some embodiments, the adhesive layer 116 may not be continuous along a length thereof. Instead, some embodiments, may include adhesive at two or more discontinuous locations along the length of the illustrated adhesive layer, such as ten (10) mm squares at each outward corner of the adhesive layer, at three locations along the length of the adhesive layer, and the like.

The support layer 114 can be bonded to the first surface 104 of media layer 102 using an appropriate bonding technique. In one example, the support layer 114 can be bonded to the first surface 104 using an ultrasonic lamination technique. Alternatively, the surfaces can be bonded using a stamping lamination technique. Stamping in such embodiments refers to a process of applying at least one of heat and pressure in a continuous or dis-continuous process. In another example, the support layer 114 can be bonded to the first surface 104 using a hot melt lamination process. The media layer can, in one example, be made of a fiber material. The support layer 114 can be made, in some examples, of a spunbound nonwoven material, or a plastic netting. FIGS. 3A-3E provide photographs of surface views of various plastic netting types that can be used, amongst others. As shown, the netting may have different shaped sub-cells, including square, rectangular, triangular, diamond-shaped, or the like.

In at least one example, the air filter 100, and specifically the media layer 102 of the air filter 100, can be electrostatically charged. The electrostatic charge on the media layer 102 creates a greater particulate attraction force to the layer and thus allows for higher functioning filtration of the filter 100.

Figure 4A:
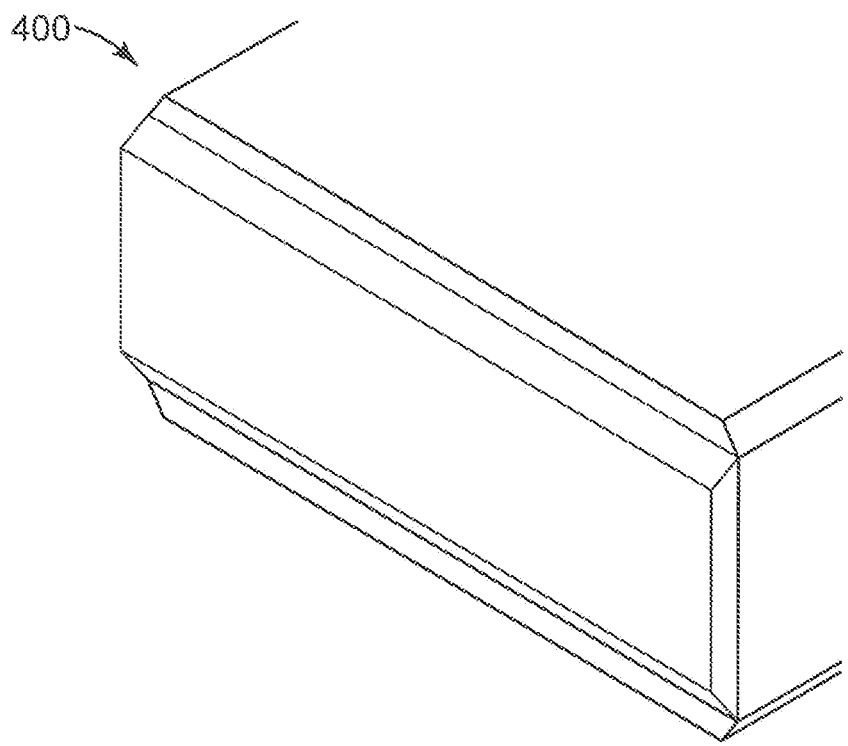
FIGS. 4A and 4B provide view of an air conditioning unit incorporating that can incorporate an exemplary air filter according to the present description.
Figure 4B:
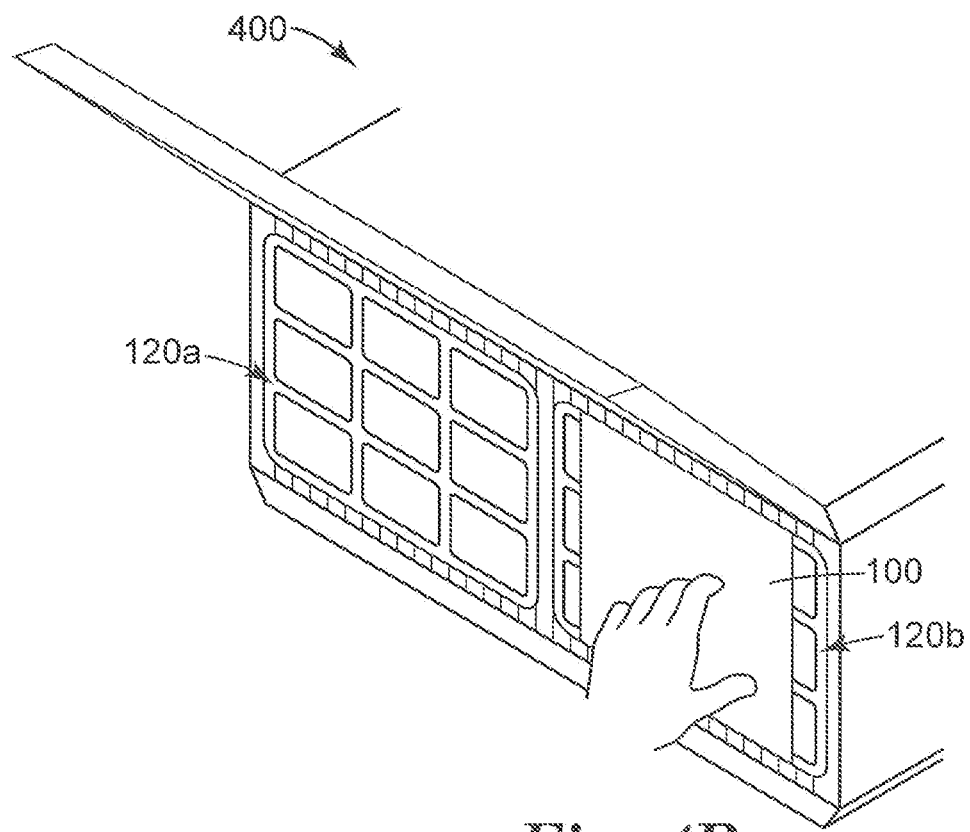

FIG. 4A provides a perspective view of an exemplary air conditioning unit 400 in which the presently described air filters can be utilized. FIG. 4B illustrates an exemplary air conditioning unit 400 with the filter housing opened. The illustrated air conditioning unit 400 includes a planar filter configuration. However, in other embodiments, air conditioning units may have curved surfaces and accordingly curved or wrapped filter configurations. As further shown, the air conditioning unit 400 can include two integrated rigid air filters 120a and 120b. As further illustrated on integrated rigid filter 120b, when an air filter 100 according to the present description is applied, the air filter can generally cover between about 65% and 85% of the surface area of the integrated rigid air filter 120b. This ensures, in such embodiments, that at least some of the air is allowed to pass through the integrated air filter 120b without passing through the air filter 100, and balances overall airflow into the air conditioning unit 400 (while still providing a good deal of air purification).

Figure 5A:
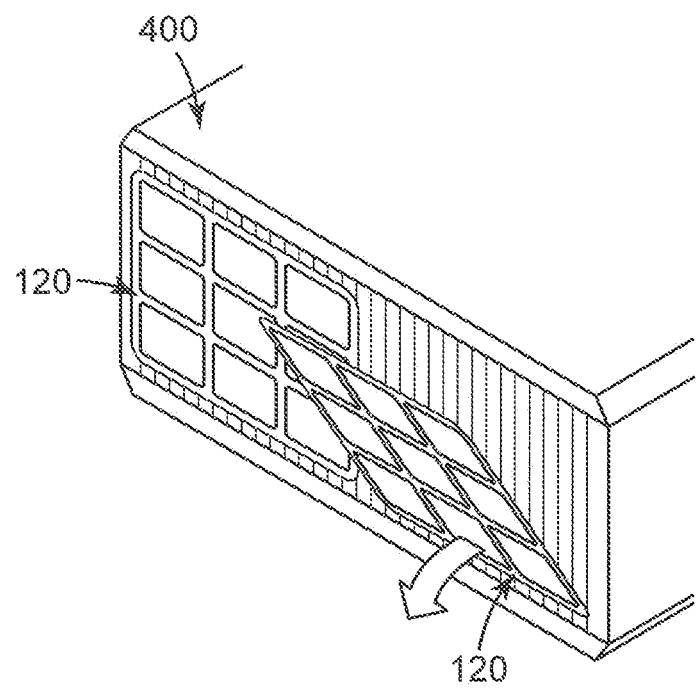
FIGS. 5A-5D provide perspective views of various steps in a process of applying an exemplary air filter of the present description to a rigid air filter of an air conditioning unit.
Figure 5B:
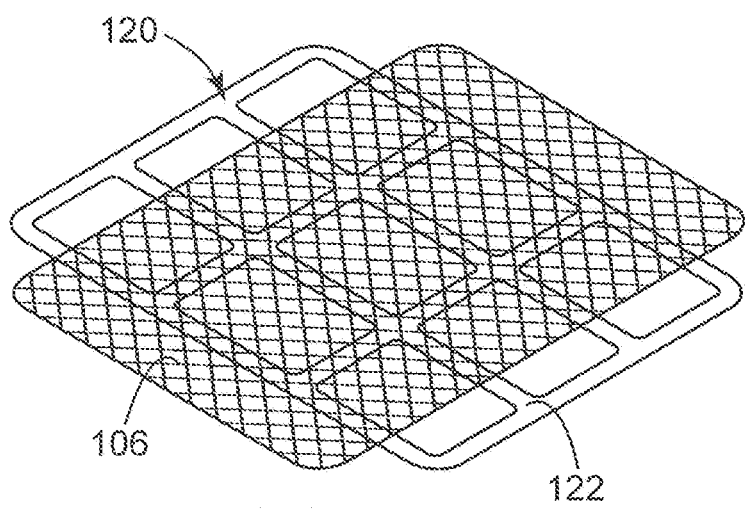

FIGS. 5A-5D provide perspective view of the integrated rigid air filters 120 and air filter 100 in various states of application. As shown in FIG. 5A, the integrated rigid air filter or filters 120 can be removed from the air conditioning unit 400. Next, as shown in FIG. 5B, at least the first region 106 of the first surface 104 of the air filter 100 can be applied to a surface 122 of the integrated air filter 120. Surface 122 corresponds to the opposite surface from the surface that faces the cooling mechanism of the air conditioning unit 400 when the integrated air filter 120 is positioned in the unit 400. When the air filter 100 is applied, the majority of the air filter 100 is positioned on an intake side 124 of the air conditioning unit 400 (see FIG. 5D).

Figure 5C:
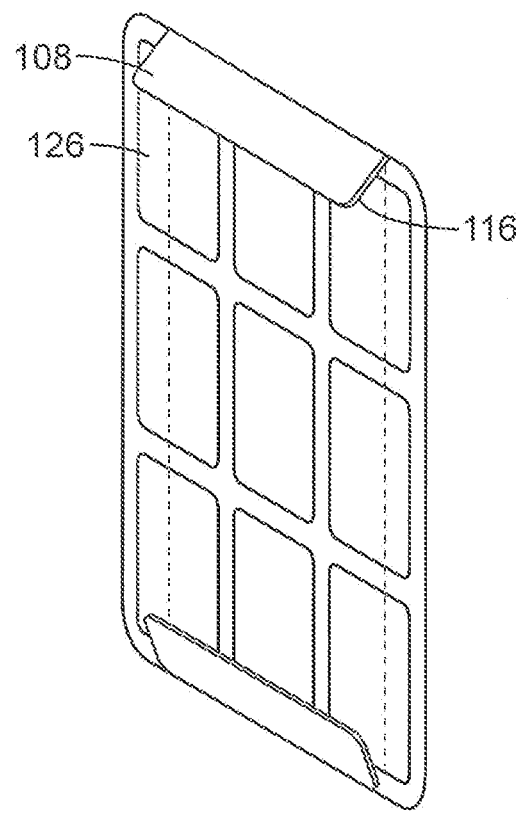
Figure 5D:
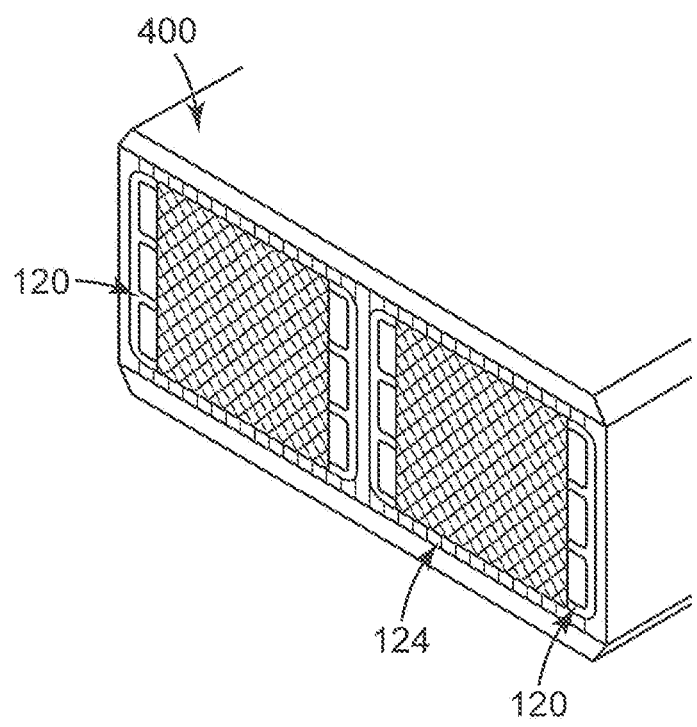

As further illustrated in FIG. 5C, while the majority of the first surface 104 conforms to the opposing surface 122 of the integrated air filter 120, a portion of the surface 104 in the second region 108 in some embodiments wraps around the side of the integrated rigid air filter 120. In some embodiments, a portion equivalent in size as the portion of the second region 108 of the surface 104 opposite the second region 108 may also wrap around the opposite side of the integrated rigid air filter 120 in some further embodiments. In other embodiments, equivalent portions of the first surface 104 along outward edges of the surface 104 may extend more outward and also wrap around the integrated rigid air filter 120 in an equal or similar manner. This may include three, four, or more portions of the surface 104 that wrap around the rigid air filter 120, depending on the particular embodiment and shapes of the surface 104 and the rigid air filter 120. In such embodiments, the portions that wrap around the integrated rigid air filter 120 may be of the same size or be sized differently. Regardless of the sizes of the portions that wrap around the integrated rigid air filter 120, a sum of the total area of these portions of the first surface 104 that wrap around the integrated rigid air filter cover are greater percentage of the whole of the first surface 104 than described above with regard to FIG. 1. Additionally in such embodiments, each of the portions of the first surface that wrap around the rigid air filter 120 also includes equivalent support and adhesive layers 114, 116 and liner 118 as described with regard to FIG. 1 and FIG. 2.

The adhesive layer 116 bonds to a back surface 126 of the integrated rigid air filter 120 opposite surface 122 (where the back surface 126 faces the cooling unit of the air conditioning unit 400 when placed back in position), after the liner 118 is removed and adhesive layer 116 is exposed.

Returning to FIG. 1, in another example of the present description, the air filter 100 will also appear as generally shown in FIG. 1. However, in the present example, no support layer 114 is provided. Instead, the media layer 102, which in the present example is made, at least in part, of fibers, which exhibit different surface properties on first surface 104 in the first region 106 and second region 108. For example, the fibers proximate the first surface 104 in the second region 108 can be more densely configured than the fibers proximate the first surface 104 in the first region 106. In view of the "densified" nature of the fibers in the second region 108, the second region 108 can be configured to receive an adhesive layer 116 and liner 118 with sufficient bonding strength that the media layer 102 is not disturbed when the liner 118 is removed from the adhesive layer 116. The second region 108 in the present example can be densified by a number of appropriate techniques. For example, the fibers of the second region 108 can be densified proximate surface 104 by ultrasonic welding the second region 108 of the layer 102. Alternatively, the fibers of the second region 108 can be densified proximate surface 104 by using a stamping technique on the second region 108 of the layer 102. The other properties of the air filter remain the same as those discussed above, with the exception that the adhesive layer 116 is applied directly to the media layer 102 and not to a support layer.

Figure 6:
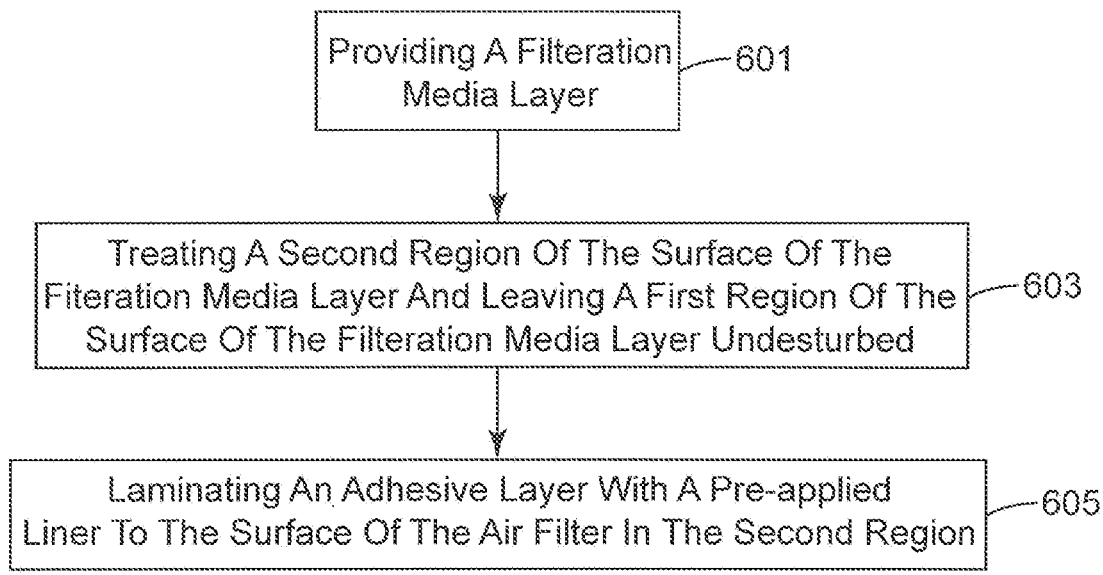
FIG. 6 is a flow chart of an exemplary method of manufacturing an air filter according to the present description.

In another aspect, the present description relates to a method of manufacturing an air filter. The method, as shown in the flowchart in FIG. 6, can include the steps of: providing a filtration media layer (601); treating a second region of a surface of the filtration media layer and leaving a first region of the surface of the filtration media layer undisturbed (603); and laminating an adhesive layer with a pre-applied liner over the surface of the air filter in the second region (605). In one example treating the second region (e.g. region 108 described above), can include densifying fibers of the second region using a stamping or ultrasonic bonding process. Alternatively, treating the second region can include applying a support layer (e.g. layer 114 described above) over the surface 104 of the media layer 102 in the second region 108 and bonding the support layer 114 to the surface 104, such that the adhesive layer 116 is laminated to a surface of the support layer 114. In this case, the support layer 114 can be bonded to the surface 104 using ultrasonic lamination, stamping lamination or a hot melt lamination technique. An example of a process of creating the filter is provided in greater detail in FIG. 7.

Figure 7:
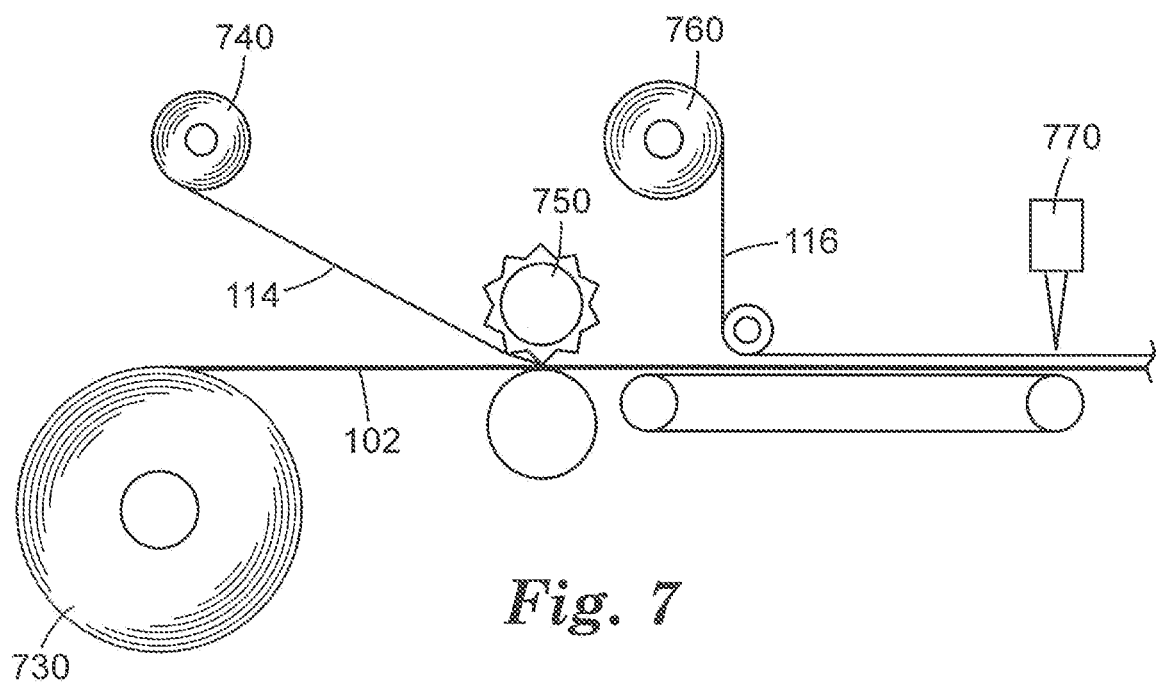
FIG. 7 is a diagram of an apparatus for performing an exemplary method of manufacturing an air filter according to the present description.

FIG. 7 provides an exemplary roll-to-roll process for creating an air filter according to the present description. A roll 730 of filtration media layer 102, potentially a fibrous media layer, is provided. Support layer 114 from roll 740 (potentially a spunbound nonwoven material or plastic netting) can be laminated to the media layer at laminator 750. After the support layer 114 and media layer 102 have been laminated together over the second region 108 of the media layer 102, an adhesive layer 116 from roll 760 can be applied over the support layer 114. Finally, the filter can be cut to the appropriate size at cutting tool 770.

VARIOUS NOTES & EXAMPLES

Example 1 is an air filter comprising a filtration media layer comprising a first surface that is configured to interface with an integrated rigid air filter of an air conditioning unit, the first surface comprising a first region proximate a first end of the media layer and a second region proximate a second end of the media layer, and a support layer positioned on the first surface of the media layer in the second region, the support layer providing a zone configured to receive an adhesive layer and liner with sufficient bonding strength that the media layer is not disturbed when the liner is removed.

Example 2 can include, or can optionally be combined with the subject matter of Example 1, to optionally include, wherein the support layer is bonded to the first surface of the media layer using ultrasonic lamination.

Example 3 can include, or can optionally be combined with the subject matter of Example 1 to optionally include, wherein the support layer is bonded to the first surface of the media layer using a hot melt lamination process or stamping lamination process.

Example 4 can include, or can optionally be combined with the subject matter of one or any combination of Examples 1-3 to optionally include, wherein the support layer comprises a plastic netting.

Example 5 can include, or can optionally be combined with the subject matter of one or any combination of Examples 1-4 to optionally include, wherein the second region and the first region each extend across an entire width of the media layer on the first surface.

Example 6 can include, or can optionally be combined with the subject matter of Example 5 to optionally include, wherein the second region covers between 3% and 20% of the first surface.

Example 7 can include, or can optionally be combined with the subject matter of one or any combination of Examples 1-6 to optionally include, wherein the air filter is configured to cover between 65% and 85% of the surface area of the integrated rigid air filter, such that some air is allowed to pass through the integrated rigid air filter without passing through the air filter.

Example 8 can include, or can optionally be combined with the subject matter of one or any combination of Examples 1-7 to optionally include, wherein the air filter is electrostatically charged.

Example 9 can include, or can optionally be combined with the subject matter of one or any combination of Examples 1-8 to optionally include, the adhesive layer bonded to a surface of the support layer opposite the media layer in the second region and the removable liner positioned on the opposite surface of the adhesive layer from the support layer.

Example 10 can include a kit, comprising, the air filter of Example 9, and at least one supplemental adhesive strip positioned on a liner, the supplemental adhesive strip configured to be placed on the first region of the air filter.

Example 11 can include an air conditioning unit comprising the air filter and the integrated rigid air filter of one or any combination of Examples 1-10.

Example 12 can include, or can optionally be combined with the subject matter of Example 11 to optionally include, wherein at least the first region of the first surface of the air filter is applied to an opposing surface of the integrated rigid air filter from a cooling mechanism of the air conditioning unit, such that the majority of the air filter is positioned on an intake side of the air conditioning unit.

Example 13 can include, or can optionally be combined with the subject matter of Example 12 to optionally include, wherein the majority of the first surface of the air conforms to the opposing surface of the integrated rigid air filter and at least a portion of the surface in the second region wraps around the side of the integrated rigid air filter, and the adhesive layer bonds to a back surface of the integrated rigid air filter proximate the cooling mechanism after the liner is removed.

Example 14 is an air filter, comprising: a filtration media layer comprising a first surface that is configured to interface with an integrated rigid air filter of an air conditioning unit, the first surface comprising a first region proximate a first end of the media layer and a second region proximate a second end of the media layer, wherein the filtration media layer comprises fibers, and wherein the fibers proximate the first surface in the second region are more densely configured than the fibers proximate the first surface in the first region, such that the second region is configured to receive an adhesive layer and liner with sufficient bonding strength that the media layer is not disturbed when the liner is removed.

Example 15 can include, or can optionally be combined with the subject matter of Example 14 to optionally include, wherein the second region of the deformable media layer is densified by ultrasonic welding the second region of the layer.

Example 16 can include, or can optionally be combined with the subject matter of one or any combination of Examples 14-15 to optionally include, wherein the second region of the deformable media layer is densified by stamping process treating the second region of the layer.

Example 17 can include, or can optionally be combined with the subject matter of one or any combination of Examples 14-16 to optionally include, wherein the second region and the first region each extend across an entire width of the media layer on the first surface.

Example 18 can include, or can optionally be combined with the subject matter of one or any combination of Examples 14-17 to optionally include, wherein the second region covers between 3% and 20% of the first surface.

Example 19 can include, or can optionally be combined with the subject matter of one or any combination of Examples 14-18 to optionally include, wherein the air filter is configured to cover between 65% and 85% of the surface area of the integrated rigid air filter, such that some air is allowed to pass through the integrated rigid air filter without passing through the air filter.

Example 20 can include, or can optionally be combined with the subject matter of one or any combination of Examples 14-19 to optionally include, wherein the air filter is electrostatically charged.

Example 21 can include, or can optionally be combined with the subject matter of one or any combination of Examples 14-20 to optionally include, the adhesive layer bonded to the first surface of the media layer in the second region and the removable liner positioned on the opposite surface of the adhesive layer from the media layer.

Example 22 is a kit, comprising, the air filter of Example 21, and at least one supplemental adhesive strip positioned on a liner, the supplemental adhesive strip configured to be placed on the first region of the air filter.

Example 23 is an air conditioning unit comprising the air filter and the integrated rigid air filter of any one or combination of Examples 13-20.

Example 24 can include, or can optionally be combined with the subject matter of Example 23 to optionally include, wherein, at least the first region of the first surface of the air filter is applied to an opposing surface of the integrated rigid air filter from a cooling mechanism of the air conditioning unit, such that the majority of the air filter is positioned on an intake side of the air conditioning unit.

Example 25 can include, or can optionally be combined with the subject matter of Example 24 to optionally include, wherein the majority of the first surface of the air conforms to the opposing surface of the integrated rigid air filter and at least a portion of the air filter in the second region wraps around the side of the integrated rigid air filter, and the adhesive layer bonds to a back surface of the integrated rigid air filter proximate the cooling mechanism after the liner is removed.

Example 26 is a method of manufacturing an air filter, comprising: providing a filtration media layer; treating a second region of a surface of the filtration media layer and leaving a first region of the surface of the filtration media layer undisturbed; laminating an adhesive layer with a pre-applied liner to the surface of the air filter in the second region.

Example 27 can include, or can optionally be combined with the subject matter of Example 26 to optionally include, wherein treating the second region comprises densifying fibers of the second region using a stamping or ultrasonic bonding process.

Example 28 can include, or can optionally be combined with the subject matter of one or any combination of Examples 26-27 to optionally include, wherein treating the second region comprises applying a support layer over the surface of the media layer in the second region and bonding the support layer to the surface, such that the adhesive layer is laminated to a surface of the support layer.

Example 29 can include, or can optionally be combined with the subject matter of Example 28 to optionally include, wherein bonding the support layer to the surface is performed using ultrasonic lamination, stamping lamination, or a hot melt lamination technique.

Example 30 can include, or can optionally be combined with the subject matter of one or any combination of Examples 28-29 to optionally include, wherein the support layer comprises plastic netting.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An air filter, comprising:
   filtration media comprising a first surface comprising a first region proximate a first end of the media and a second region proximate a second end of the media;
   wherein at least a portion of the second region of the filtration media further comprises a densified region in which fibers in the filtration media that are proximate the first surface in the second region are more densely configured than the fibers proximate the first surface in the first region; and
   an adhesive on at least a portion of the densified region.

2. The air filter of claim 1, wherein the second region and the first region each extend across an entire width of the filtration media on the first surface.

3. The air filter of claim 1, wherein no adhesive is provided on the first region of the filtration media.

4. The air filter of claim 1, wherein the second region covers between 3% and 20% of the area of the first surface.

5. The air filter of claim 1, further including a liner on the adhesive, wherein the filtration media has sufficient bonding strength that the filtration media is not disturbed when the liner is removed from the adhesive.

6. The air filter of claim 1, wherein the adhesive is cleanly removable from an integrated rigid air filter of an air conditioning unit.

7. The air filter of claim 1, wherein the densified region is ultrasonically welded or hot pressed.

8. The air filter of claim 1, further comprising:
   a third region proximate the first end of the media and opposite of the second end of the media; and
   the adhesive on at least a portion of the third region of the filtration media;
   wherein at least a portion of the third region of the filtration media further comprises at least one of:

a support layer positioned adjacent to the first surface of the filtration media; and a densified region in which fibers in the filtration media that are proximate the first surface in the third region are more densely configured than the fibers proximate the first surface in the first region.

9. An air conditioning unit comprising the air filter of claim 1.

10. The air conditioning unit of claim 9, wherein at least the first region of the first surface of the air filter is applied to an opposing surface of an integrated rigid air filter from a cooling mechanism of the air conditioning unit, such that the majority of the air filter is positioned on an intake side of the air conditioning unit.

11. The air conditioning unit of claim 10, wherein the majority of the first surface of the air filter conforms to the opposing surface of the integrated rigid air filter and at least a portion of the first surface in the second region wraps around a side of the integrated rigid air filter, and the adhesive bonds to a back surface of the integrated rigid air filter proximate the cooling mechanism.

12. The air conditioning unit of claim 10, wherein the air filter is configured to cover between 65% and 85% of the total surface area of the integrated rigid air filter, such that some air is allowed to pass through the integrated rigid air filter without passing through the air filter.

* * * * *